United States Patent [19]

Ikeda et al.

[11] Patent Number: 4,793,184
[45] Date of Patent: Dec. 27, 1988

[54] ULTRASONIC IMAGING APPARATUS AND METHOD OF FORMING AN ULTRASONIC IMAGE OF AN OBJECT

[75] Inventors: Hiroshi Ikeda, Hachioji; Kageyoshi Katakura; Toshio Ogawa, both of Tokyo; Shin'ichiro Umemura, Hachioji; Shinichi Kondo, Kodaira, all of Japan

[73] Assignees: Hitachi Ltd.; Hitachi Medical Corporation, both of Tokyo, Japan

[21] Appl. No.: 898,518

[22] Filed: Aug. 21, 1986

[30] Foreign Application Priority Data

Oct. 9, 1985 [JP] Japan .................. 60-223610
Nov. 22, 1985 [JP] Japan .................. 60-261221

[51] Int. Cl.$^4$ .......................................... G01N 29/04
[52] U.S. Cl. .................................. 73/626; 73/628
[58] Field of Search ............................ 73/626, 628

[56] References Cited

U.S. PATENT DOCUMENTS 4,359,767 11/1982 Sachs et al. ................... 73/626
4,448,076 5/1984 van Heelsbergen .......... 73/628
4,553,437 11/1985 Luthra et al. .................. 73/626
4,561,308 12/1985 Bele et al. ...................... 73/626

Primary Examiner—Stewart J. Levy
Assistant Examiner—Louis M. Arana
Attorney, Agent, or Firm—Antonelli, Terry & Wands

[57] ABSTRACT

An ultrasonic imaging apparatus and method of forming an image of an acoustic image of an object employing the aperture synthesis technique, in which at least one partial aperture for accommodating a predetermined number of successive transducers is established and applied to a transducer array to select the predetermined number of successive transducers accommodated in the partial aperture so that the selected transducers serve to transmit ultrasonic acoustic signals to an object and receive signals reflected from the object, and the at least one partial aperture is specifically moved along the arrayed transducers for similar signal transmission to and/or signal reception from the object, whereby the apparatus and the method do not suffer substantial noise caused during changeover between transmitting and receiving operation modes and/or enjoy and enlarged aperture for signal transmission or enlarged aperture for signal reception with a suppressed decrease of the frame rate.

16 Claims, 6 Drawing Sheets

-20dB BEAM WIDTH: 1.7mm

-10dB BEAM WIDTH: 1.2mm

-20dB BEAM WIDTH: 1.6mm

-10dB BEAM WIDTH: 1.2mm

-20dB BEAM WIDTH: 1.9mm

-10dB BEAM WIDTH: 1.3mm

RASTER NUMBER

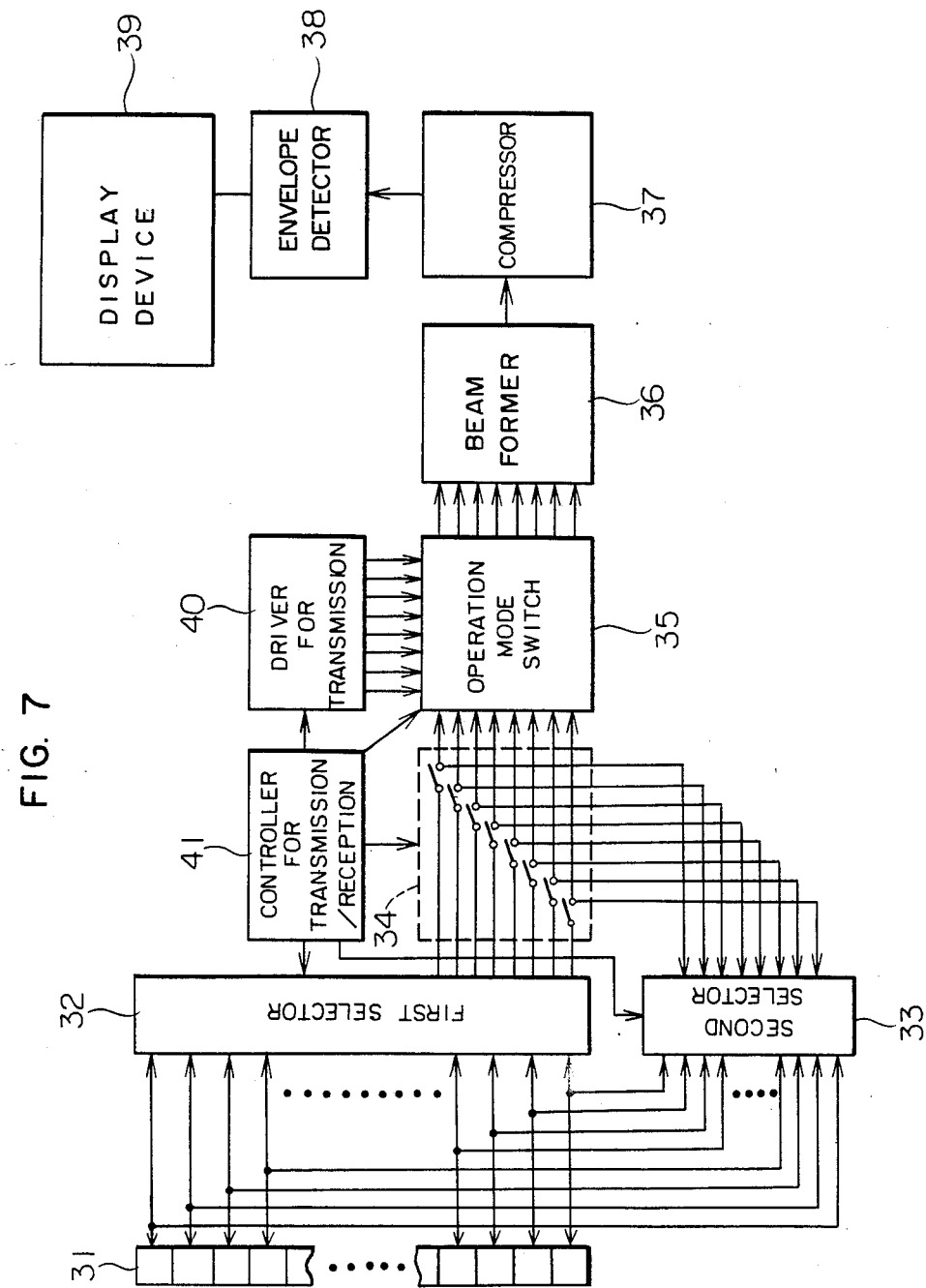

ULTRASONIC IMAGING APPARATUS AND METHOD OF FORMING AN ULTRASONIC IMAGE OF AN OBJECT

BACKGROUND OF THE INVENTION

This invention relates to an ultrasonic imaging apparatus and a method of forming an ultrasonic image of an object, the apparatus and method being based on the aperture synthesis technique and suitable for a high resolution imaging.

The conventional aperture synthesis technique is intended to achieve an enlarged receiving aperture frame, in which a similar ultrasonic beam is transmitted several times and the received signals are combined by switching receiving partial apertures so as to obtain a total-aperture reception signal, as disclosed in JP-A No. 58-132677 (corresponding to U.S. patent application Ser. No. 769,805 filed on Aug. 27, 1985 which is a continuation application of U.S. patent application Ser. No. 463,652 filed on Feb. 3, 1983 now abandoned). The above technique, however, does not deal at all with switching noise caused due to the fact that different transducers are selected for ultrasonic beam transmission and reception.

SUMMARY OF THE INVENTION

An object of this invention is to provide an ultrasonic imaging apparatus and a method of forming an acoustic image of an object, based on the aperture synthesis technique, which is virtually unsusceptible to noise arising at the switching of transmission and reception modes.

Another object of this invention is to provide an ultrasonic imaging apparatus and a method of forming an acoustic image of an object, based on the aperture synthesis technique, which is intended to have an enlarged transmitting aperture.

A further object of this invention is to provide an ultrasonic imaging apparatus and a method of forming an acoustic image of an object, based on the aperture synthesis technique, which is intended to have an enlarged receiving aperture, suppressing a decrease of the frame rate.

BRIEF DESCRIPTION OF THE DRAWINGS

FIG. 7 is a block diagram showing an example of the structure of the embodiment of FIG. 6.

DESCRIPTION OF THE PREFERRED EMBODIMENTS

Figure 1:
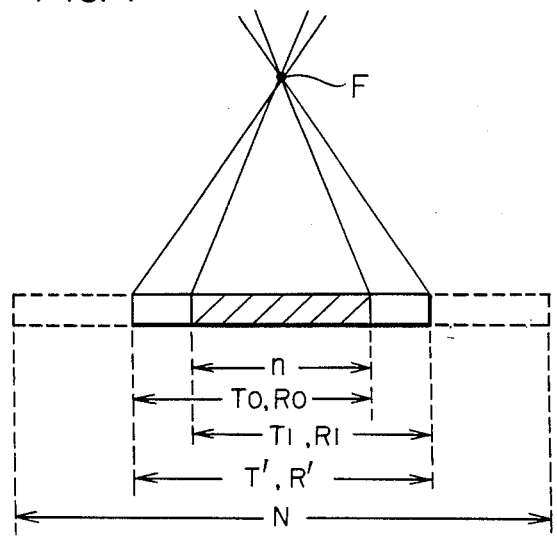
FIG. 1 is a diagram illustrating the operation of aperture synthesis by an ultrasonic imaging apparatus embodying the present invention.

In FIG. 1 showing an important aspect of the operation of an ultrasonic imaging apparatus according to an embodiment of this invention, symbol N denotes an array of transducers, $T_0$ and $T_1$ denote transmitting partial apertures accommodating a predetermined number m of transducers, $R_0$ and $R_1$ denote receiving partial apertures m accommodating transducers, T' denotes a synthesized transmitting aperture, R' denote a synthesized receiving aperture, n denotes an overlap between the partial apertures, and F denotes a convergent point of an ultrasonic beam in an object.

In an aperture synthesizing operation, the transmitting and receiving partial apertures $T_0$ and $R_0$ are applied to the whole array of transducers to select a predetermined number of (m) transducers, and an ultrasonic beam is emitted from the selected transducers to an object (not shown) and converged to a convergent point F for transmission and reception, as shown in the figure. Subsequently, transducers accommodated in the transmitting and receiving partial apertures $T_1$ and $R_1$ ($T_1 = T_0$, $R_1 = R_0$), which are the results of movement of the above-mentioned partial apertures $T_0$ and $R_0$ by a distance identical with (m−n) transducers (m>n≧0) are selected. The ultrasonic beam is transmitted and received in the same way as above, electric signals received for the receiving partial apertures $R_0$ and $R_1$ are phased (phase adjustment for matching the phases of electric signals received from the transducers) and added to each other with the phase information in the received signals retained, and a reception signal for the synthesized receiving aperture R' is produced. The produced synthesized reception signal is equivalent to an output signal obtained by phasing and adding of electric reception signals resulting from conversion of acoustic signals received with aperture $R' = R_0 + R_1 - n$, the received acoustic signals being produced responsive to acoustic signals transmitted with aperture $T' = T_0 + T_1 - n$. Or otherwise, the produced synthesized reception signal is at least equivalent to an output signal obtained by phasing and adding electric reception signals resulting from conversion of acoustic signals received with aperture $R_0$, the received acoustic signal being responsive to acoustic signals transmitted with aperture $T_0$.

Figure 2:
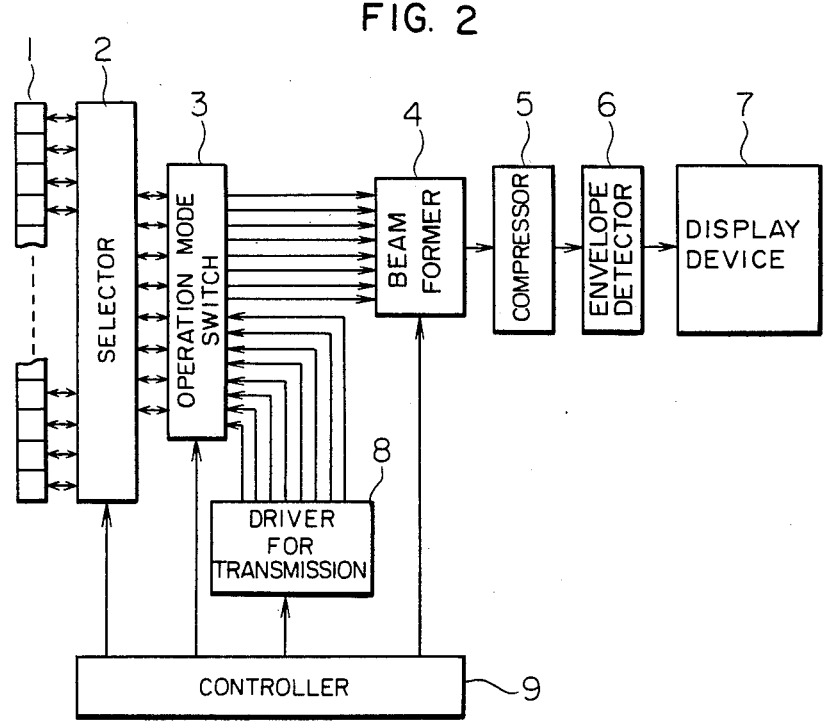
FIG. 2 is a block diagram showing an example of the structure of the embodiment illustrated in FIG. 1.

FIG. 2 shows in block diagram an embodiment of this invention, in which an ultrasonic imaging apparatus may include an array of transducers 1, a transducer selecting circuit 2, transmitting/receiving operation mode switch 3, a beam former 4 for phasing and addition of signals, a compression circuit 5, an envelope detection circuit 6, a display device 7, a driver 8 for transmission, and a control circuit 9.

In the above arrangement, m transducers accommodated in the transmitting partial aperture $T_0$ or $T_1$ and partial receiving aperture $R_0$ or $R_1$, as shown in FIG. 1, are selected among the transducers in the array 1 by the selecting circuit 2 under the control of the control circuit 9. For signal transmission, the driver 8 supplies a drive pulse signals including pulses, which are controlled in the amplitude and phase by the control circuit 9, to the transducers accommodated in the established transmitting partial aperture $T_0$ and selected among the transducer array 1 via the switch 3 and selecting circuit 2. For signal reception, the beam former 4 is controlled by the control circuit 9 so that the received signals are fed through the selecting circuit 2 and switch 3, and phased for the receiving partial aperture R , and the result is memorized. Similar operations are repeated for the number of times necessary for a signal synthesis, and an electric output signal for a synthesized aperture produced by phasing and addition of 2m electric signals from (2m−n) transducers accommodated in apertures $R_0$ and $R_1$ by the beam former 4, is processed by the compression circuit 5 and detection circuit 6 and delivered to the display device 7. The above operations are repeated, while moving the synthesized transmitting and receiving aperture T', R', by a distance identical with one transducer, each time signal transmission and reception has been completed for one synthesized aperture, as shown in FIG. 1, in the azimuthal direction, that is, along the transducer array 1, and an ultrasonic image is displayed on the display device 7.

The beam former 4 in FIG. 2 will be described in more detail with reference to FIGS. 3a and 3b, in which reference number 11 denotes a partial beam former for a partial aperture, 12 denotes an adder, 13 denotes a line memory, and 14 denotes an envelope detector.

Figure 3A:
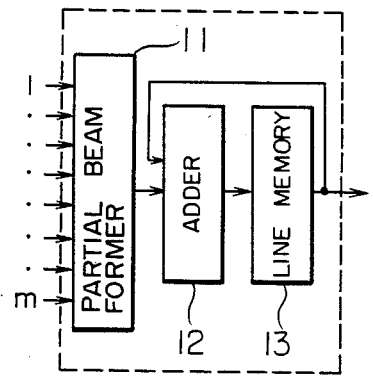
FIGS. 3a and 3b are diagrams explaining examples of the structure of the beam former used in the apparatus shown in FIG. 2.
Figure 3B:
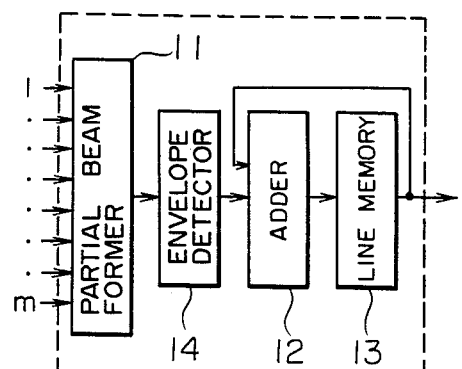

By the arrangement shown in FIG. 3a, the first reception signals Si of m channels (m is a positive integer) for the transmitting and receiving partial apertures $T_0$ and $R_0$, as shown in FIG. 1, are phased and added by the partial beam former 11 for a partial addition, processed by the adder 12, and stored in the line memory 13. Subsequently, next reception signals $S_{i+1}$ of m channels obtained by switching the transmitting and receiving partial apertures to $T_1$ and $R_1$ are phased and added by the partial beam former 11 for a partial addition, thereafter, subjected to coherent-addition by the adder 12 to the reception signals Si which have been stored previously in the line memory 13 and outputted via the line memory 13.

The signal phasing and addition as described above enables simplification of the structures of the beam former and the selecting circuit necessary accomplishing a enlarged aperture.

In case an object to be imaged tends to move suddenly, the received signals may have a diminished amplitude due to phasic cancellation among the signals. In such a case, the outputs of the partial beam former 11 are first fe to the envelope detector 14 and the outputs of the detector 14 are added for coherent addition, thereby solving the above-mentioned problem.

Figure 4A:
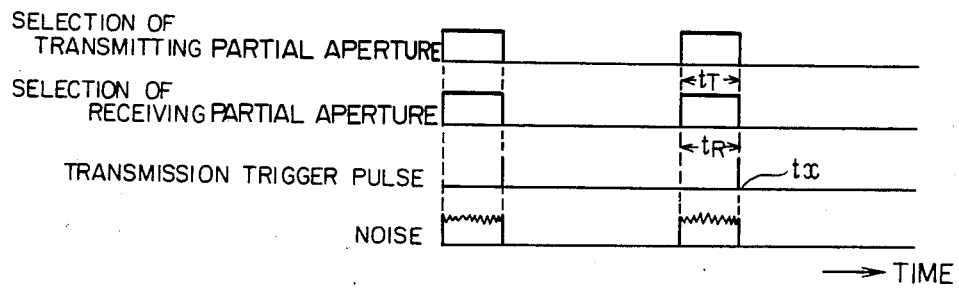
FIGS. 4a and 4b are timing charts used to explain the transmitting and receiving operations of the apparatus shown in FIG. 2.
Figure 4B:
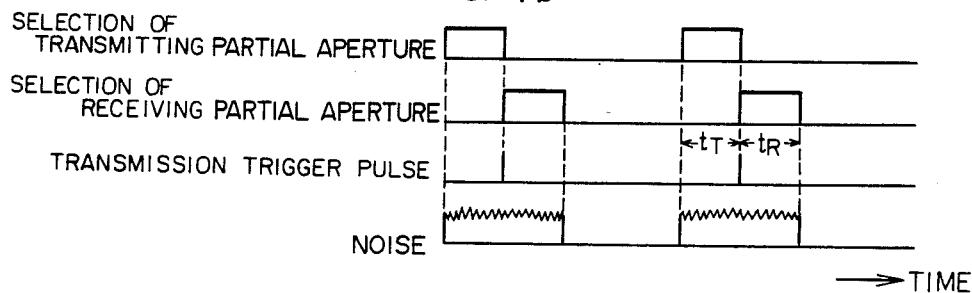

FIGS. 4a and 4b show in timing chart effects in one aspect of this invention, in which $t_T$ and $t_R$ represent time spent in selecting the partial apertures for transmission and reception, respectively. In FIG. 4a, the transmitting and receiving partial apertures accommodate the same transducers in the same range actuatable at one time, so that the transmitting partial aperture $T_0$ and the receiving partial aperture R are selected simultaneously ($t_T = t_R$) according to one aspect of this invention. Accordingly, when signal transmission takes place at $t_x$, signal reception is possible immediately following the transmission. However, if the transmitting and receiving partial apertures accommodate one or more transducers in different ranges actuatable at one time, e.g., T for signal transmission and R for signal reception, selection of transducers accommodated in the receiving partial aperture will commence after signal transmission, and therefore signal reception will take place with a delay of $t_R$ following the time point $t_x$, as shown in FIG. 4b. On this account, the depth $r_o$ on the display screen at which reception of can commence becomes unfavorably $r_o = t_R \cdot v/2$, where v denotes the sound velocity. As an advantage of this invention, as will be appreciated from FIG. 4a, the receiving partial apertures can be synthesized without the influence of noise which is created in the aperture movement at the switching of the transmission/reception operation modes. In contrast, the case of FIG. 4b obviously results in the creation of noise due to the aperture movement at transmission, which adversely affects reception.

Figure 5A:
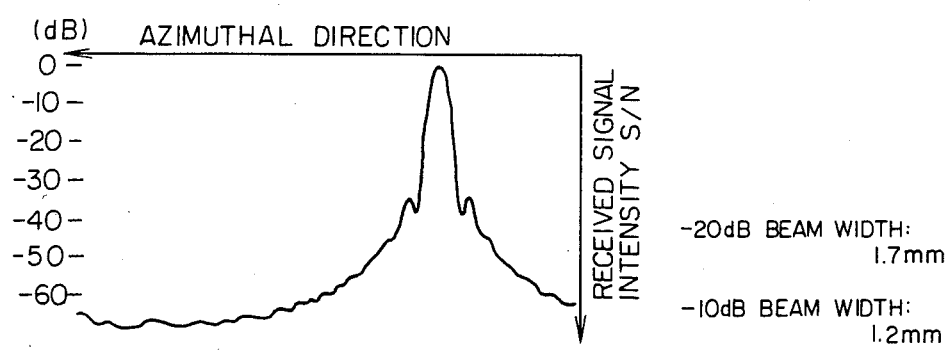
FIGS. 5a, 5b and 5c are graphs comparing directivity of embodiments of this invention.
Figure 5B:
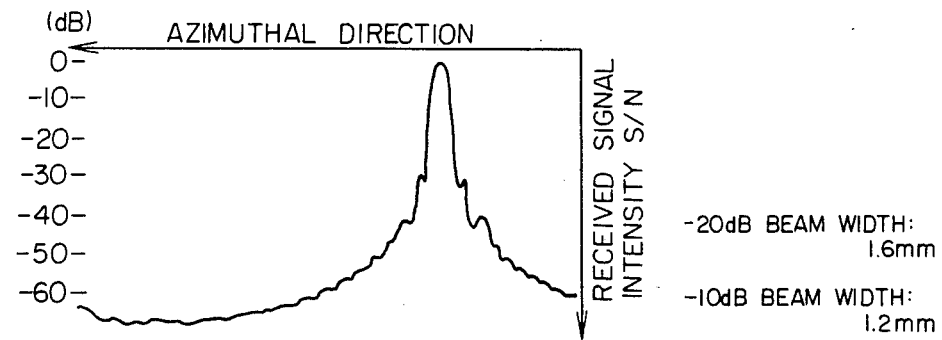
Figure 5C:
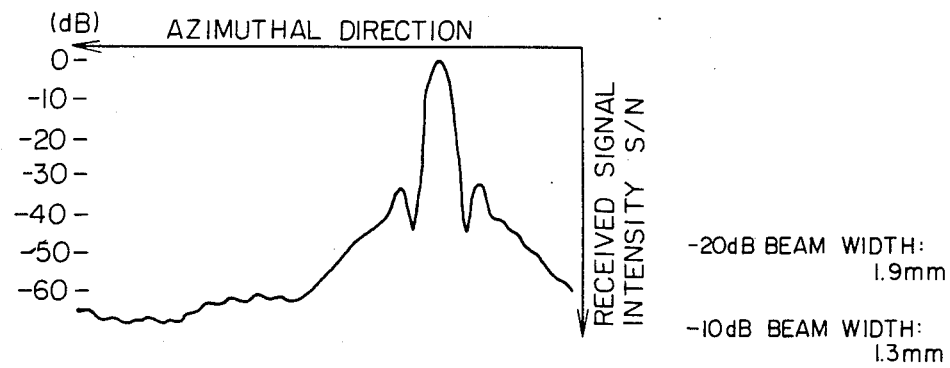

FIGS. 5a–5c show the results of measurement of directivity of the ultrasonic beams, two of which are formed by the use of the foregoing aperture synthesis techniques. The conditions of measurement are as follows (also see FIG. 1 for the definition of apertures). The transducer width, i.e., the transducer-to-transducer distance is set for 1 mm; the transmitting partial apertures $T_0$ and $T_1$ are equal to the receiving partial apertures $R_0$ and $R_1$, and are set for 20 mm; the convergent point of the ultrasonic beam is set for 70 mm measured on the center line of the overlap section; the ultrasonic beam frequency is set for 3.5 MHz.

FIG. 5a shows a beam directivity resulting from transmission and reception with 1.5 $T_0$ and 1.5 $R_0$ without synthesis of aperture, in which the beam widths at −20 dB and at −10 dB are 1.7 mm and 12 mm, respectively. FIG. 5b shows a beam directivity achieved by aperture synthesis with a 50% overlap (n), in which the beam widths at −20 dB and at −10 dB are 1.6 mm and 1.2 mm, respectively, these values being comparable with the case of FIG. 5a. FIG. 5c shows a beam directivity achieved by aperture synthesis with a 40% overlap (n), in which the beam widths at −20 dB and at −10 dB are 1.9 mm and 1.3 mm, respectively, these values being also comparable with or slightly inferior in the directivity to the case without aperture synthesis shown in FIG. 5a. Thus, aperture synthesis with less than 40% overlap may result in an extremely inferior directivity, and an overlap of 40% or more is desired.

Although the above description has been mainly devoted to the cases of synthesizing the total-aperture signal by moving successively two transmitting and receiving partial apertures (e.g., $T_0$ and $R_0$, and $T_1$ and $R_1$), such that the two apertures ($T_0$ and $T_1$ or $R_0$ and $R_1$) in both sets accommodate the same number of transducers and have an overlap therebetween, the present invention is not limited to this, but is of course applicable to the case of synthesizing the total-aperture signal by moving successively more than two transmitting and receiving partial apertures such that these different apertures have an overlap between adjacent apertures.

The present invention is also effective for the case where the transmitting and receiving synthesized apertures have different values, and is of course applicable to the cases where a plurality of ultrasonic beam convergent points are formed for transmission, and the receiving synthesized aperture is variable.

The embodiments described above is particularly effective for the enlargement of aperture in imaging a portion at a relatively small depth in the direction of ultrasonic beam radiation. The following embodiments with reference to FIGS. 6 and 7 are particularly effective for the enlargement of aperture in imaging a portion at a relatively large depth in the direction of ultrasonic beam radiation.

Figure 6:
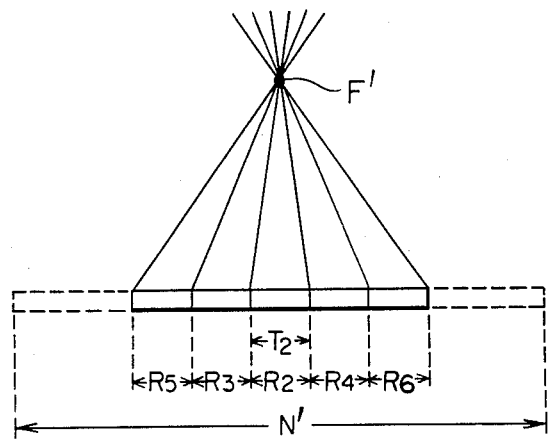
FIG. 6 is a diagram showing the operation of aperture synthesis by the ultrasonic imaging apparatus according to another embodiment of this invention.

In FIG. 6, an aperture is synthesized from five partial apertures with the central partial aperture serving as both transmitting and receiving partial apertures $T_2$ and $R_2$. Symbol N' denotes an array of transducers, $T_2$ denotes a transmitting aperture, $R_2$, $R_3$, $R_4$, $R_5$ and $R_6$ denote receiving partial apertures, and F' denotes a convergent point of the ultrasonic beam.

FIG. 7 shows an ultrasonic imaging apparatus embodying the present invention, in which the apparatus may include an array of transducers 31, first and second transducer selecting circuits 32 and 33, an adder 34 for adding those signals which receive same delay processing, a transmission/reception operation mode switch 35, a beam former 36 for phasing and addition of signals, a compression circuit 37, an envelop detection circuit 38, a display device 39, a drive circuit 40 for signal transmission, and a transmission/reception control circuit 41.

The following describes the formation of an ultrasonic beam by synthesizing apertures through the selection of transducers by movement of partial apertures as shown in FIG. 6 in the apparatus shown in FIG. 7. For signal transmission, the transmission/reception control circuit 41 sets the mode switch 35 for the transmission mode, and all switches in the adder 34 are turned off. Under the control of the control circuit 41, the second transducer selecting circuit 33 selects a predetermined number of transducers accommodated in the transmitting partial aperture $T_2$ among the whole transducer array 31. The selected transducers are activated by the operations of the second transducer selecting circuit 33, adder 34, transmission/reception mode switch 35 and transmission drive circuit 40. For the initial signal reception, the control circuit 41 switches the transmission/reception mode switch 35 to the reception mode, the receiving partial aperture $R_2$ which accommodates the same transducers as the transmitting partial aperture $T_2$ is applied to the transducer array 31, and the received signals are fed to the beam former 36 through the route opposite to transmission. The beam former 36 has the same structure as that of FIGS. 3a or 3b, and the phased signals are stored in the line memory 13.

Subsequently, transmission takes place in the same way as above. For the second reception, the first and second transducer selecting circuits 32 and 33 select transducers accommodated in the receiving partial apertures $R_3$ and $R_4$ same in number as those accommodated in $T_2$ and $R_2$. At this time, the receiving partial apertures $R_3$ and $R_4$ are located at symmetrical positions with respect to the beam convergent point F, and the signal delay operations for both apertures are the same. The control circuit 41 turns on the switches in the adder 34 so as to deal with two signals with a single processing means by making use of the symmetry of the two signals, whereby the signals received for the two receiving partial apertures $R_3$ and $R_4$ can be processed at one time with the single processing means. The reception signals are phased by the beam former 36 and added to the signals which have been received for the receiving partial aperture $R_2$ and stored in the memory with phase information being retained, and the resulting signal is stored in the line memory 13. These operations are repeated for the partial apertures $R_5$ and $R_6$ that are the result of movement from $R_3$ and $R_4$ by a distance identical with the predetermined number of transducers and a reception signal for the total receiving aperture that is the sum of $R_2$, $R_3$, $R_4$, $R_5$ and $R_6$ is synthesized. The signal from the beam former 36 is processed by the compression circuit 37 and detection circuit 38, and delivered to the display device 39. By repeating the above operations, while moving the transmitting and receiving apertures successively, an ultrasonic image is displayed on the display device 9.

By the above-described phasing and addition of received signals, even when signal synthesis is effected n times (n>0), the receiving aperture can be enlarged to (2n+1) times the receiving partial aperture without a significant sacrifice of the frame rate. Thus, the above-described embodiment is particularly effective for forming an ultrasonic beam for a portion at a relatively large depth which generally requires a large aperture. By the arrangement shown in FIG. 7, aperture synthesis shown in FIG. 1 is also applicable.

Accordingly, for formation of an ultrasonic image of an object to be displayed on the display device, ultrasonic images of those parts of an object which are to be displayed in a range of a relatively small depth $L_1$ should be formed by the embodiments described with reference to FIG. 1, while those parts of the object which are to be displayed in a range of a relatively large depth $L_2$ should be formed by the embodiments described with reference to FIGS. 6 and 7, thereby to complete the total image.

Figure 8:
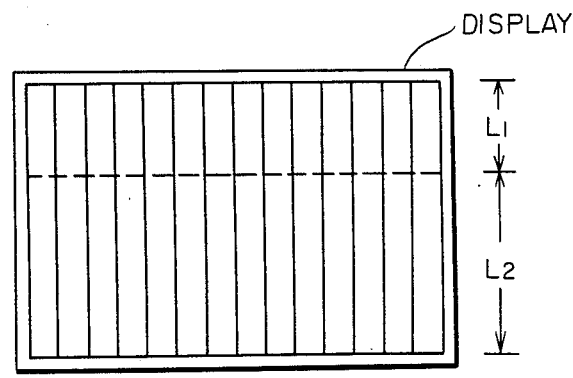
FIG. 8 is a diagram showing aperture synthesis and display range of ultrasonic images.
Figure 9:
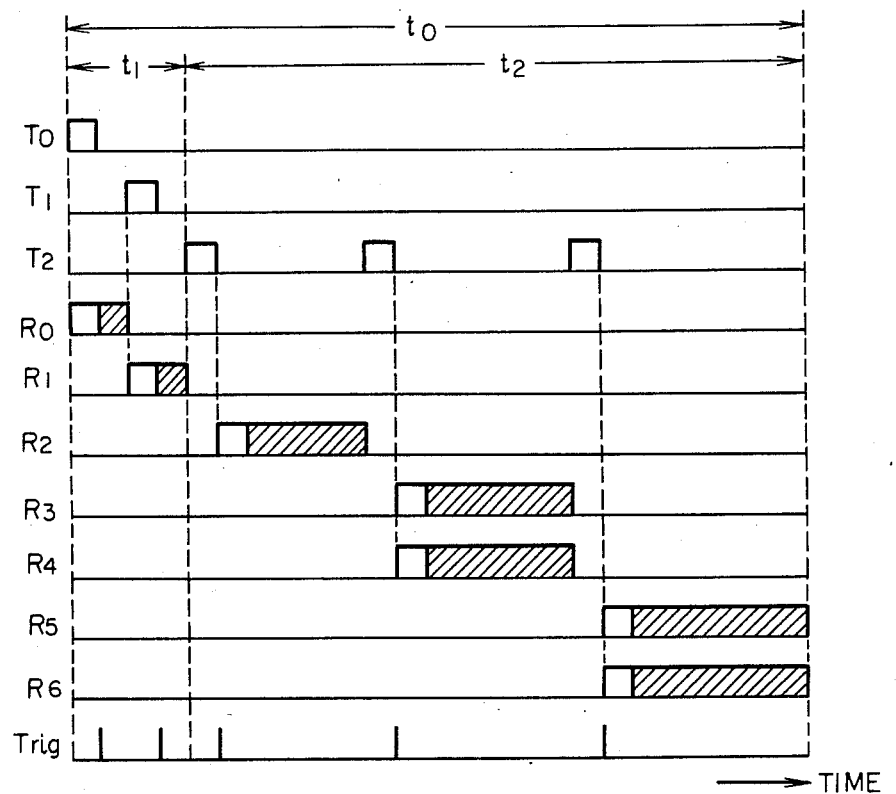
FIG. 9 is a timing chart used to explain the transmitting and receiving operations of the apparatus shown in FIG. 7.

FIG. 9 shows in timing chart the operation of FIG. 8. On the chart, symbols $T_0$, $T_1$ and $R_0$–$R_6$ represents ultrasonic imaging according to the illustration in the partial apertures shown in FIGS. 1 and 6, Trig indicates the timing of signal transmission, represents a time length required to form a raster of an ultrasonic image as in FIG. 8, $t_1$ represents a time length corresponding to a range of depth $L_1$, and $t_2$ represents a time length corresponding to a range of depth $L_2$.

The number of partial apertures described in the above embodiments is solely for the explanatory purpose, and the aperture may of course be divided into more number of partial apertures depending on the use, frame rate required and circuit complexity.

Although the above embodiments relate to a fixed convergent point system, the present invention is not limited to this, but the invention is of course applicable to the cases where transmission takes place with more than one beam convergent point and the total receiving aperture is variable. The present invention is also effective for the case where the composed receiving aperture is varied depending on the depth of the convergent point, with the intention of enhanced resolution of the ultrasonic image.

We claim:

1. An ultrasonic imaging apparatus operative to converge an ultrasonic beam by controlling the phase of signals transmitted and received by an array of transducers so as to produce an ultrasonic image of an object, said apparatus comprising:

means having a plurality of transmitting and receiving partial apertures, each implementing both transmission and reception operations;

means for switching said partial apertures;

means for storing received signals; and means for summing received signals with said stored received signals of partial apertures associated with different transmission operations with phase information thereof being retained, thereby to synthesize reception signal for a total aperture.

2. An ultrasonic imaging apparatus according to claim 1, wherein adjacent ones of said partial apertures have an overlap which is at least 40% in size of a partial aperture.

3. An ultrasonic imaging apparatus operative to converge an ultrasonic beam by controlling the phase of signals transmitted and received by an array of transducers so as to produce an ultrasonic image of an object, the central one of an odd number of partial apertures being a transmitting and receiving aperture, said apparatus comprising:
- means for making other partial apertures receiving apertures;
- means for transmitting said ultrasonic beam in said transmitting partial aperture to a same convergent point iteratively a plurality of times;
- means for simultaneous reception in two receiving partial apertures located symmetrically with respect to a normal which is drawn from said convergent point onto the plane of said transducer array;
- means for switching said receiving partial apertures; and
- means for storing signals; and
- means for summing received signals with stored received signals of partial apertures each associated with different ones of the iterative transmission operations with phase information thereof being retained, thereby to synthesize a reception signal for a total aperture.

4. An ultrasonic imaging apparatus comprising:
- transducer means including a plurality of arrayed transducers capable of conversion between electric energy and acoustic energy;
- means for selecting a predetermined number of successive transducers among said plurality of arrayed transducers;
- means for driving the selected successive transducers so that they transmit ultrasonic acoustic signals to an object when they are in transmitting operation mode;
- control means for establishing at least one partial aperture for accommodating said predetermined number of successive transducers to be selected and controlling said selecting means and said driving means so that said partial aperture is moved along said arrayed transducers, each time at least signal transmission to said object from said selected predetermined number of successive transducers accommodated in the partial aperture before it is moved has been completed, to substitute at least a part of the selected transducers, accommodated in the partial aperture before it is moved, with a corresponding number of transducers succeeding the said selected transducers and the successive transducers accommodated in the moved partial aperture are selected for at least one of the signal transmission to and signal reception from said object, one of said at least one partial aperture serving to perform both signal transmission and signal reception; and
- means coupled to said transducer means through said selecting means for processing electric signals produced by the selected transducer accommodated in said aperture responsive to acoustic signals reflected from said object, said processing means including means for summing said electric signals associated with different transmission operations with phase information thereof being retained, thereby to synthesize a reception signal for a total aperture.

5. An apparatus according to claim 4, in which:
- said predetermined number of successive transducers to be selected is m; and
- said control means establishes a single partial aperture for accommodating said m successive transducers to be selected and includes first aperture moving means for moving, each time signal transmission to and signal reception form said object with the same m selected transducers accommodated in the partial aperture before it is moved have been completed, said partial aperture along said arrayed transducers in such a manner that (m−n) (n: a predetermined number smaller than m) successive transducers succeeding the previously selected m transducers are newly selected and n successive transducers among said previously selected m transducers are again selected in a spatially overlapping relation, and includes second aperture moving means for moving said partial aperture from its position before the movement by said first aperture moving means along said arrayed transducers by a distance identical with one transducer each time processing of electric signals produced by (2m−n) successive transducers selected to be accommodated in two successive partial apertures as a result of the partial aperture movement by said first aperture moving means has been completed.

6. An apparatus according to claim 4, in which m>n≧0.4 m.

7. An apparatus according to claim 4, in which:
- said transducer means includes first add second half parts of said arrayed transducers;
- said selecting mean includes first and second selectors for said first and second half parts of said arrayed transducers, respectively; and
- said control means establishes a first partial aperture for accommodating said selected predetermine number of successive transducers for signal transmission to and signal reception from said object and second and third partial apertures, each for accommodating a second predetermined number of successive transducers adjoining to a different one end of said selected predetermined number of successive transducers accommodated in said first partial aperture, for signal reception from said object and controls said first and second selectors and said driving means so that said second and third partial apertures are substantially simultaneously moved along said first and second half parts of said arrayed transducers in opposite directions by a distance identical with said second predetermined number of successive transducers for signal transmission to said object by said predetermined number of successive transducers accommodated in said first partial aperture has been completed except when said first partial aperture performs signal reception from said object.

8. A method for forming an image of an object by the use of transducer means including a plurality of arrayed transducers capable of conversion between electric energy and acoustic energy, comprising the steps of:
(a) establishing a partial aperture for accommodating m (m: positive integer) successive transducers;
(b) applying said partial aperture to said transducer means so that m successive transducers accommodated in said partial aperture are selected for both signal transmission and signal reception;
(c) transmitting ultrasonic acoustic signals to an object and receiving acoustic signals reflected from said object with said selected m successive transducers accommodated in said partial aperture:

(d) moving said partial aperture along said arrayed transducers by a distance identical with (m−n) (n: positive integer small than m) transducers so that the n successive transducers among said m transducers accommodated in the partial aperture before it is moved are against selected and (m−n) successive transducers succeeding said m transducers accommodated in the partial aperture before it is moved are newly selected;

(e) transmitting ultrasonic acoustic signals to said object and receiving acoustic signals reflected from said object with the m successive transducers accommodated in the moved partial aperture;

(f) processing 2m electric signals produced by (2m−n) successive transducers selected and accommodated in the two successive partial apertures in steps (c) and (e);

(g) moving, after step (f), said partial aperture from its position in step (b) along said arrayed transducers by a distance identical with one transducer so that m successive transducers are selected;

(h) repeating steps (c)-(g) for the whole of said arrayed transducers; and (i) summing electric signals obtained successively in the unit of said two successive partial apertures with the phase information thereof being retained, thereby to enable formation of image of said object.

9. A method of forming an image of an object by the use of transducer means including a plurality of arrayed transducers capable of conversion between electric energy and acoustic energy, comprising the steps of:

(a) establishing a first partial aperture for accommodating j (j: positive integer) successive transducers;

(b) applying said first partial aperture to said transducer means so that j successive transducers accommodated in said first partial aperture are selected;

(c) transmitting ultrasonic acoustic signals to an object and receiving acoustic signals reflected from said object with said selected j successive transducers accommodated in said first partial aperture;

(d) processing electric signals produced by said j successive transducers accommodated in said first partial aperture;

(e) establishing second and third partial apertures each for accommodating j successive transducers and applying said second and third partial apertures to said transducer means so that j successive transducers adjoining to each end of said selected j successive transducers accommodated in said first partial aperture are selected;

(f) transmitting ultrasonic acoustic signals to said object with the j successive transducers accommodated in said first partial aperture and substantially simultaneously receiving acoustic signals reflected from said object with said selected 2j transducers accommodated in said second and third partial apertures (g) processing electric signals produced by said 2j transducers accommodated in said second and third partial apertures;

(h) moving said second and third partial apertures along said arrayed transducers in opposite directions by a distance identical with j transducers so that j successive transducers adjoining to the selected j successive transducers accommodated in said second and third partial apertures before they are moved are selected; and (i) repeating steps (f)-(h) for the whole of said arrayed transducers.

10. An ultrasonic imaging apparatus according to claim 1, wherein each of the plurality of transmitting and receiving partial apertures implementing both transmission and reception operations comprise the same transducers of the array of transducers.

11. An ultrasonic imaging apparatus according to claim 3, wherein the central one of the odd number of partial apertures being a transmitting and receiving aperture comprises the same transducers of the array of transducers.

12. An ultrasonic imaging apparatus according to claim 4, wherein said one of said at least one partial aperture serving to perform both signal transmission and signal reception comprises the same transducers among said plurality of arrayed transducers.

13. A method of forming an image of an object according to claim 8, wherein step (b) includes selecting the same m successive transducers for both signal transmission and signal reception of said partial aperture.

14. A method of forming an image of an object according to claim 9, wherein steps (b) and (c) includes utilizing the same selected j successive transducers for transmission and reception in said first partial aperture.

15. An ultrasonic imaging apparatus according to claim 1, wherein said means for switching switches said partial apertures so that at least a partial aperture rendered operative for a transmission operation by switching is overlapped with a partial aperture operative for a transmission operation before the switching, and further comprising means for shifting said transmitting and receiving partial apertures so that said total aperture is sequentially displaced for obtaining signals of plural scanning lines.

16. A method of forming an image of an object according to claim 8, wherein step (h) includes repeating steps (c)-(g) a number of times identical with (2m−n), said step (i) includes summing the electric signals thereby to synthesize a reception signal for a total aperture, and further comprising step (j) of repeating steps (a)-(i) so that the resulting total apertures cover the entirety of said arrayed transducer successively in the unit of successive (2m−n) transducers.

* * * * *